United States Patent [19]

Stern

[11] Patent Number: 4,608,426

[45] Date of Patent: Aug. 26, 1986

[54] BIS-MALEIMIDE RESIN COMPOSITION

[75] Inventor: Bruce A. Stern, Fallston, Md.

[73] Assignee: American Cyanamid Company, Stamford, Conn.

[21] Appl. No.: 695,989

[22] Filed: Jan. 29, 1985

[51] Int. Cl.$^4$ .............................................. C08G 69/00
[52] U.S. Cl. .................................... 528/170; 526/262; 526/313
[58] Field of Search ........................ 526/262, 313, 170

[56] References Cited

U.S. PATENT DOCUMENTS

| 4,100,140 | 7/1978 | Zahir et al. | 526/90 |
| 4,131,632 | 12/1978 | Suzuki et al. | 526/313 |
| 4,131,707 | 12/1978 | Zahir et al. | 528/170 |
| 4,160,859 | 7/1979 | Renner et al. | 528/170 |
| 4,247,670 | 1/1981 | Renner et al. | 528/170 |
| 4,266,047 | 5/1981 | Jablonski et al. | 528/170 |
| 4,276,352 | 6/1981 | Green | 428/473.5 |
| 4,288,583 | 9/1981 | Zahir et al. | 526/262 |
| 4,298,720 | 11/1981 | Yamazaki et al. | 526/262 |
| 4,454,283 | 6/1984 | Street et al. | 524/424 |

*Primary Examiner*—Paul R. Michl
*Assistant Examiner*—Alex H. Walker
*Attorney, Agent, or Firm*—William H. Calnan

[57] ABSTRACT

A novel bis-imide matrix resin composition comprising (i) 40 to 95 percent by weight of ethyleneically unsaturated bis-imides, preferably a low melting mixture of a major portion of maleimides of aromatic amines such as toluene diamine and methylene dianiline with a minor portion of maleimide of an aliphatic amine such as trimethyl hexamethylene diamine, (ii) 5 percent to 60 percent by weight of a heatactivatible cross-linking agent combination for gelling the bis-imides, said combination comprising (1) an arylene polyamine and (2) an alkenylphenol or alkenylphenol ether, and, as a polymerization catalyst therefor, (iii) an imidazole compound. The resin composition is useful as a matrix resin for high performance, fiber reinforced composites, having low shrinkage, good thermal stability and moisture resistance and excellent impact strength.

11 Claims, No Drawings

BIS-MALEIMIDE RESIN COMPOSITION

CROSS-REFERENCE TO RELATED APPLICATION

This application is related to a concurrently filed application of S. L. Peake, R. G. Lees and D. M. B. Tuttle, entitled HEAT-CURABLE POLYMERS WHICH CONTAIN IMIDE GROUPS AND PROCESS, Ser. No. 695,992 filed Jan. 29, 1985.

BACKGROUND OF THE INVENTION

This invention relates to a novel matrix resin, and more particularly, to a bis-maleimide resin and high temperature, high performance fiber composites thereof.

Bis-maleimide (BMI) materials are based on the condensation reaction of maleic anhydride with amines, usually diamines, to yield a fully imidized material that can crosslink without the evolution of volatiles to produce a structural matrix. The crosslinking is typically accomplished by means of homopolymerization of the unsaturated maleimide end cap and by Michael addition utilizing additional amine as a curing agent. The resultant cured resin has an intermediate thermal stability between the epoxies and the high temperature polyimide (PI) materials. Thermal performance is good to about 500° F., but not above, and thermo-oxidative stability is less than the high temperature PI's. The major advantage of BMI resins is epoxy-like processing without the evolution of volatiles in cure so that very low void content composites can be produced. Additionally, the systems are usually formulated to cure in the 350°–400° F. region under moderate pressure which means that conventional process equipment, autoclaves and presses, and conventional vacuum bagging materials can be used. Of the high temperature PI's, only the condensation types are processable under these conditions, and these have the major drawback of high void content in the finished structure.

Some of these materials are described in U.S. Pat. No. 3,380,964. Typically, three basic compositions comprise: (i) those which contain a single BMI base resin, e.g., methylene bisphenyl maleimide, and an aromatic diamine, e.g., methylene dianiline (MDA); (ii) those which contain a single BMI resin without diamine; and (iii) those which comprise a eutectic blend of three BMI base resins including at least one with an aliphatic backbone. All of these materials are solids at ambient. The latter two are relatively low melting materials, and the last-mentioned is an extemely low viscosity and low reactivity material containing neither free diamine nor catalyst. The first-mentioned is the highest viscosity member of this group, may be prereacted, and has relatively high reactivity at 350° F.

In the present state of the art, BMI materials are being selected over epoxies due to increased 350°–400° F. performance, particularly following hot/wet conditioning. A major use of graphite/BMI is for supersonic fighter wing skins. They are also being used in helicopter parts. Another use is for very long term 350° F. nacelle stuctures (30,000 hours). Interest has also been expressed in BMI materials for other aerospace applications. The best positioned material to date is a system embodied in U.S. Pat. No. 4,454,283 which is a eutectic BMI blend with divinyl benzene as a reactive tackifier. A curing agent or catalyst is also present, either in the base resin or added to it. This is the best current BMI with tack and drape for mechanical properties and thermo-oxidative stability, but it still has drawbacks. Among these is a strong odor, potential handling toxicity, and still insufficient oxidative stability. This BMI system is better than others on graphite in that apparently less microcacking is observed in composites made with it.

Another state-of-the-art system is described in U.S. Pat. No. 4,100,140, the BMI resin being cured with an alkenyl phenol or alkenylphenol ether. While such compositions provide laminated structures with better impact performance than the BMI eutectic blend with divinyl benzene, their hot strength properties are not as good, and after exposure to moisture, the hot strength properties are extremely poor.

In the present state-of-the-art, therefore, problems remaining to be resolved for the successful development of a structural BMI product are cure shrinkage (and microcracking), handleability, handling toxicity, ease of cure, and environmental stability—thermo-oxidative and hydrothermal. Such a resin composition can offer a great potential for even wider use if toughness can be incorporated in addition to the thermal properties, and such a resin composition is provided by the present invention.

SUMMARY OF THE INVENTION

In accordance with the present invention novel and improved bis-imide matrix resin compositions are provided having high Tg, low water absorption after exposure to a hot, wet environment, and high impact strength and resistance to edge delamination. The uncured resin has good latency and tack, and cures at low pressure and temperatures in a few hours with low shrinkage, good elongation and strength, and no tendency to blister.

The resin composition of the invention preferably includes 40 percent to 95 percent by weight of unsaturated bis-imide and 5 to 60 percent by weight of a combination of polyamine and alkenyl phenol or alkenyl phenol ether cross-linking agent capable of curing the bis-imide at temperatures of, for example, from above 200° F. to 400° F.

In addition a low temperature curing catalyst comprising an imidazole reduces gel time at temperature thereby improving processability and providing superior properties.

This invention in its preferred aspects contemplates a resin composition comprising:

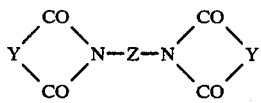

where Y represents a divalent radical of at least 2 carbon atoms and contains a carbon-carbon double bond and in major portion of the mixture, Z is the residue of at least one aromatic diamine and in the minor portion of the mixture Z is the residue of an aliphatic diamine;

(ii) 5 to 60 percent by weight of a heat-activatible cross-linking agent combination for said bis-imides (i), said combination comprising (1) 1 to 99 parts by weight of an arylene polyamine compound and (2) 99 to 1 parts by weight of an alkenyl phenol or an alkenylphenol ether; and (iii) 0 to 5 percent by weight of an imidazole polymerization catalyst.

The resin composition of the invention may be utilized neat or dissolved in solvent such as methylene chloride in an amount of 99 percent to 0.1 percent by weight solids. The neat resin system is applied as a hot melt to fiber reinforcement such as carbon, KEVLAR ®, (organic polyimide fibers), KURALON ® (non-water soluble, high molecular weight, polyvinyl alcohol fibers), graphite or fiberglass, quartz, ceramic, e.g., NEXTEL ®, filaments, fibers or cloths to form prepregs in an amount of 20 to 80 parts by weight of resin solids, usually 25 parts to 50 parts by weight, per 100 parts by weight of resin and reinforcement. The resin system is advanced to a solid cured state by heating the resin to a temperature of from, e.g., 250° F. to 600° F. for 1 to 20 hours. A typical procedure for forming a composite is to apply the uncured resin to undirectional graphite fibers to form a prepreg tape. Multiple plies of the prepreg tape are laid up in a single direction of cross-direction and are placed in an autoclave and heated under pressure of 0 psi to 200 psi at a temperature of 325° F. to 375° F. for 2 to 8 hours followed by a free-standing post cure in an oven at a temperature from 400° F. to 600° F. for 2 to 10 hours. The description in above-mentioned U.S. Pat. No. 4,454,283 is useful to show the conventionality of such manipulative steps.

These and many other features and attendant advantages of the invention will become apparent as the invention becomes better understood by reference to the following detailed description.

DETAILED DESCRIPTION OF THE INVENTION

The N',N-bis-imides of an unsaturated carboxylic acid (i) can be selected from compounds of the formula:

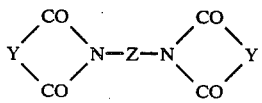

where Y represents a divalent radical of at least 2 carbon atoms, preferably 2 to 6 carbon atoms, containing a carbon-carbon double bond and Z is a divalent radical containing at least 2 carbon atoms and generally not more than 20 carbon atoms. Z may be aliphatic, cycloaliphatic, aromatic or heterocyclic. Y may be derived from acids or anhydrides such as maleic, citraconic, Nadic, tetrahydrophthalic, tetrahydronaphthalic and the like.

Representative N,N'-bis-imides that may be employed are the N,N'-bis-maleimides of ethylene diamine, hexamethylene diamine, phenylene diamine, trimethylhexamethylene diamine, methylene dianiline, toluene diamine, 4,4'-diphenylmethane diamine, 3,3'-diphenylsulfone diamine, 4,4-diphenylether diamine, 4,4'-diphenylsulfone diamine, 4,4'-dicyclohexanemethane diamine, metaxylylene diamine, or 4,4'-diphenylcyclohexane diamine and mixtures thereof. Other N,N'-bis-maleimides and their process of preparation are disclosed in U.S. Pat. Nos. 3,562,223, 3,627,780 and 3,839,358.

The N-N'-unsaturated bis-imides are preferably derived from at least one aromatic diamine since resins based on imides of aromatic diamines have better high temperature stability. However, the bis-imides of aromatic amines have high melting points making it difficult to form composites or prepregs at a convenient temperature. Therefore, it is preferred to utilize a mixture of 75 to 95 percent of at least one aromatic bis-imide with a lower melting aliphatic bis-imide since it is found that a eutectic-like mixture melting at lower temperature is formed. See, e.g., U.S. Pat. No. 3,380,964. A preferred mixture of bis-imides contains 50 to 80 percent by weight of the bis-imide of methylene dianiline (MDA), 5 to 30 percent of the bis-imide of toluene diamine (TDA) and 5 to 25 percent of the bis-imide of trimethyl hexamethylene diamine (THDA). For example, the bis-maleimide of methylene dianiline melts at 148°–152° C., the bis-maleimide of toluene diamine melts at 161°–163° C., and the bis-maleimide of trimethylhexamethylene diamine melts at about 121° C. Yet a mixture of bis-maleimides containing 64 percent MDA, 21 percent TDA and 15 percent THDA melts at 70° to 125° C.

The polyamines used as component (ii)(1) will be of the general formulae:

$$G-(NH_2)_y \text{ or}$$

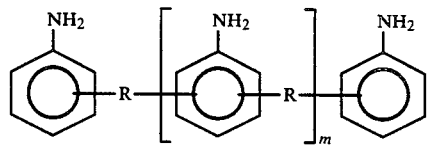

wherein G is a y-valent organic radical having 2 to 40 carbon atoms and y is an integer from 2 to 4, and each R is a divalent hydrocarbon radical obtained by removing the oxygen atom of an aldehyde or ketone having 1 to 8 carbon atoms, and m represents a number from 0.1 to 2.

The polyamines of the formulae are known compounds. If the polyamine is a diprimary polyamine, G has the same meaning as A above and y denotes 2.

A preferred family of amines are arylene polyamine compounds of the formulae:

$$X-Q-(NH_2)_{y'} \text{ or}$$

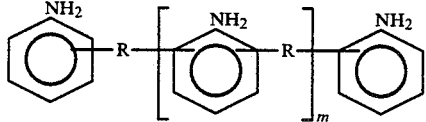

wherein X is selected from hydrogen, lower alkyl, halogen, or mixtures thereof, and Q is a divalent radical comprising at least two aryl radicals atached directly to each other or through a member selected from an alkylene radical, straight chain or branched, of from 2 to 12 carbon atoms, —S—, —SO$_2$—, —CO—, —O—, —CO$_2$—(CH$_2$)$_p$—CO$_2$— wherein p is from 2 to 12, or a mixture of any of the foregoing members, and y' is 2, R each are divalent hydrocarbon radicals obtained by removing the oxygen atom of an aldehyde or ketone having 1 to 8 carbon atoms, and m is a number of from 0.1 to 2.

Illustrative of diamines are: 4,4'-diamino-dicyclohexylmethane, 1,4-diaminocyclohexane, m-phenylenediamine, p-phenylenediamine, 4,4'-diamino-diphenylmethane, bis-(4-aminophenyl)-2,2-propane, 4,4'-diaminodiphenyl ether, 4,4'-diaminodiphenylsulfone, 1,5-diaminoaphthalene, m-xylylenediamine, p-xylylenediamine, ethylenediamine, hexamethylenediamine, bis-(gamma-aminopropyl)-5,5-dimethyl-hydantoin and 4,4'-diaminotriphenyl phosphate, and the like. m-Phenylenediamine, 4,4'-di-aminodiphenylmethane, 4,4'-diamino-diphenyl ether, 3,3'-diamino-diphenyl sulfone, hexamethylenediamine, 4,4'-diamino-triphenyl phosphate or 4,4'-diamino-triphenyl thiophosphate are preferred.

Polyamines different from the diprimary polyamines include those which have less than 40 carbon atoms and contain 3 or 4 $NH_2$ groups per molecule. The $NH_2$ groups can be substituents on a benzene ring which is optionally substituted by methyl groups, or a naphthalene ring, on a pyridine ring or on a triazine ring. They can also be substituents on several benzene rings which are linked to one another via a single valency bond, an atom or an inert group which have already been mentioned under the diprimary polyamines.

Such polyamines include: 1,2,4-triaminobenzene, 1,3,5-triaminobenzene, 2,4,6-triaminotoluene, 2,4,6-triamino-1,3,5-trimethylbenzene, 1,3,7-tri-aminonaphthalene, 2,4,4'-triaminophenyl, 3,4,6-triaminopyridine, 2,4,4'-triaminophenyl ether, 2,4,4'-triaminodiphenylmethane, 2,4,4'-triaminodiphenyl-sulfone, 2,4,4'-triaminobenzophenone, 2,4,4'-triamino-3-methyldiphenylmethane, N,N,N-tri(4-aminophenyl)-amine, tri-(4-aminophenyl)-methane, tri-(4-aminophenyl)phosphate, tri-(4-aminophenyl)phosphite, tri-(4-aminophenyl)thiophosphate, 3,5,4'-triaminobenzanilide, melamine, 3,5,3,5'-tetraaminobenzophenone, 1,2,4,5tetraaminobenzene, 2,3,6,7-tetraaminoaphthalene, 3,3'-diaminobenzidine, 3,3',4,4'-tetraaminophenyl ether, 3,3',4,4'-tetraaminodiphenylmethane, 3,3',4,4'-tetraaminodiphenylsulfone and 3,3-bis-(3,3'-diaminophenyl)pyridine.

The polyamines of the second formula are known compounds and can be obtained in accordance with the processes described in French Patent Specifications Nos. 1,430,977 and 1,481,935 by reacting primary aromatic amines with aldehydes or ketones. Examples of aldehydes or ketones used are formaldehyde, acetaldehyde, benzaldehyde, oenanthaldehyde, acetone, methyl ethyl ketone, cyclohexanone and acetophenone.

Mixtures of 2 or more polyamines of the formulae can also be reacted with the polyimides and/or allylphenols and/or allyl-phenolethers.

The allylphenols and methallylphenols, or the ethers thereof, used as component (ii)(2) herein are preferably employed as the alkenylphenols or alkenylphenol ethers. Both mononuclear and polynuclear, preferably binuclear, alkenylphenols and alkenylphenol ethers can be employed. Preferably, at least one nucleus contains both an alkenyl group and a phenolic, optionally etherified, OH group.

Alkenylphenols can be made by rearrangement of the alkenyl ethers of phenols (for example of the allyl ether of phenol) by the action of heat (Claisen rearrangement). These alkenyl ethers are also obtained according to known processes by reacting phenols and, for example, allyl chloride in the presence of an alkali metal hydroxide and solvents. By so doing, a condensation reaction takes place with elimination of alkali metal chloride.

Typical binulcear alkenylphenols are of the formula:

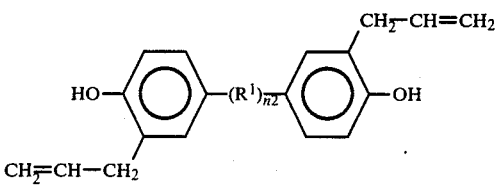

in which $R^1$ and n have the meanings set forth above.

The use of mixtures of polynuclear alkenylphenols and/or alkenylphenol ethers with mononuclear alkenylphenols and/or alkenylphenol ethers is also within the invention. The alkenylphenol ethers preferably employed are those substances which contain one or more molecular radicals of the formula:

$$-O-R^2$$

wherein $R^2$ is an alkyl radical of 1 to 10 carbon atoms, an aryl radical or an alkenyl radical, preferably allyl or methallyl, the O atom in formula representing the phenolic ether bridge.

A further feature of the invention comprises using mixtures of those substances which contain only one OH group and only one alkenyl group on the aromatic nucleus with substances which contain several OH groups and/or several alkenyl groups on the aromatic nucleus, or of mixtures of the corresponding phenol ethers of these substances.

Illustrative of alkenylphenols useful in the invention are: o,o'-diallyl-bisphenol A, 4,4'-hydroxy-3,3'-allyldiphenyl, bis-(4-hydroxy-3-allylphenyl)-methane, 2,2-bis-(4-hydroxy-3,5-diallyl-phenyl)-propane and eugenol. The corresponding methallyl compounds can also be used. In place of the said alkenylphenols it is also possible to use the corresponding ethers of these phenols, especially the methyl ethers.

The relative proportions of (b)(ii)(1) to (ii)(2) can vary widely comprising, for example, from about 1 to 99 parts to correspondingly 99 to 1 part by weight per 100 parts by weight in the combination.

If imidazole catalysts are to be employed as component (iii) they should be present in the reaction mixture in a concentration of 0.001 to 5 percent by weight, preferably of 0.1 to 1.0 percent by weight, based on the total amount of the reactants.

Representative such catalysts are embraced by the formula

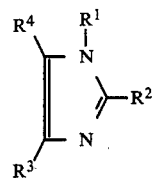

wherein $R^1$, $R^2$, $R^3$ and $R^4$ can be, independently, hydrogen, or a substituent such as $C_1$–$C_{12}$ alkyl, aryl, alkaryl, aralkyl, substituted such groups, and the like. Illustrative are imidazole, 2-phenylimidazole, 2-methylimidazole, 2-hexylimidazole, and the like. Special mention is made of 2-ethyl-4-methylimidazole.

Additives customary for use in the technology of curable plastics can also be present in conventional amounts. For example, plasticizers, pigments, dyestuffs, mold-release agents, flame retardants, and the like, can be added. Special mention is made of thixotropic agents to control flow and to minimize resin squeeze-out during laminating operations. One such thixotropic agent which has been found to be remarkably useful is finely divided fumed silica (CABOSIL M 5) which is employed in amounts of 0 to 15 percent, preferably 1 to 8 percent, based on resin component weight.

DESCRIPTION OF THE PREFERRED EMBODIMENTS

The following examples illustrate the invention, but are not intended to limit the claims. All parts and percentages are by weight.

EXAMPLES 1 AND 2

One hundred parts of a mixture of the bis-maleimides of methylene dianiline (64 percent), trimethylhexamethylene diamine (15 percent) and toluene diamine (21 percent) (KERIMID ® 353, Rhone-Poulenc) were mixed with 10 parts by weight of 3,3'-diaminodiphenyl sulfone, 25 parts of o,o'-diallyl-bis-phenol A (CIBA-Geigy) and 0.25 parts of 2-ethyl-5-methylimidazole. Five parts of a finely divided silica (CABOSIL M 5) was added as a thixotrope. The composition gelled at a temperature of 350° F. in 12 minutes. The bis-maleimide without 2-ethyl-4-methylimidazole required more than 20 minutes at a temperature of 350° F. to gel.

The composition is used to impregnate graphite and carbon fibrous reinforcements in the form of tapes. The resin contents range from to 28 parts to 42 parts per 100 parts of resin plus fiber. The tapes are assembled into layers and consolidated under heat (350°–400° F.) and moderate pressure (40–100 psi) into laminated panels. Good panels are obtained, with low shrinkage, well controlled, low flow, no blistering, having good thermal stability and excellent impact strength. The properties obtained will be tabulated hereafter for comparison with state of the art systems. Example 1 comprises intermediate modulus carbon fibers; Example 2 comprises high strength fibers.

EXAMPLE 3

The resin composition of Example 1 is used to impregnate glass and quartz fibrous reinforcements in the form of fabric. The resin contents range from 25 to 40 parts per 100 parts of resin plus fiber. The impregnated fabric material is consolidated under heat and pressure into laminated shapes which are suitable for radomes. Good panels are obtained with low flow, low shrinkage, no blistering, good thermal stability and excellent impact strength.

PROCEDURE A

For comparison purposes, a state-of-the-art bis-maleimide system (U.S. Pat. No. 4,454,283) was formulated, and laminates comprising unidirectional graphite fiber tapes were impregnated with it and tested. 85 parts of the mixture bis-maleimides used in Example 1 herein, 27 parts of 55 percent divinyl benzene, 5 parts of the trifunctional curing agent, triallyl isocyanurate and 1 part of the oxidation inhibitor, hydroquinone. During preparation and use as an impregnant for the graphite tapes, toxic odors and poor handleability were encountered. The resin contents ranged from 25 to 40 percent. The tapes were consolidated under heat and pressure into laminated panels. Good appearing panels were obtained but the impact performance was poor, and edge delamination, especially, was found to be a problem. The properties obtained will be tabulated hereafter for comparison with the compositions of this invention and that of another state-of-the-art system.

PROCEDURE B

For comparison purposes, a second and different bis-maleimide system (U.S. Pat. No. 4,100,140) was formulated, and laminates comprising unidirectional graphite fiber tapes were impregnated with it and tested. One hundred parts of N,N'-4,4'-diphenylmethane-bis-maleimide (CIBA-Geigy XU-292A) and 75 parts of o,o'-diallyl-bisphenol-A (CIBA-Geigy XU-292B) are melted at 70°–100° C. and 5 parts of a finely divided silica (CABOSIL M 5) are added as a thixotrope. The melt is used to impregnate graphite or carbon fibrous reinforcements in the form of tapes. The resin contents range from 25 to 40 parts per 100 parts of resin plus fiber. The tapes are assembled into layers and consolidated under heat and pressure into laminated panels. Good panels were obtained with no blistering. The toughness as measured by impact testing was good, but properties measured on the hot panels were not as good and when measured on hot panels after exposure to moisture, they were much worse. Flexural modulus, as a specific example, when measured on a dry panel at 450° F. was poor, and could not even be measured after the panel had been exposed to moisture.

The data obtained after measuring important physical properties are summarized in the following Table:

TABLE

PROPERTIES OF COMPOSITES COMPRISING GRAPHITE BIS-MALEIMIDE RESINS

| EXAMPLE | 1 | A | B | 2 |
|---|---|---|---|---|
| Composition (parts by weight) | | | | |
| Bis-maleimide/m-DDS/ o,o'-diallyl BPA | 28–42 | — | — | 28–42 |
| Bis-maleimide/DVB | — | 25–40 | — | — |
| Bis-maleimide/o,o'-diallyl BPA | — | — | 25–40 | — |
| Reinforcing graphite fibers | Balance* | Balance* | Balance** | Balance** |
| Properties | | | | |
| Impact Strength, peel apart mode, $G_{Ic}$ in.lbs./in$^2$ | 0.98 | 0.79 | | |
| Impact Strength, shear mode, $G_{IIc}$ in.lbs./in$^2$ | 2.04 | 1.13 | | |
| Incipient Impact Energy, IIE, ft.lbs./mil. | 4.49 | 1.80 | | |
| Impact damage area, 10 ft.-lbs. (in$^2$) | 1.02 | 3.73 | | |
| Edge Delamination Resistance | | | | |
| Stress at first crack, ksi | 26 | 14–16 | 41 | 40.9 |
| Stress at failure, ksi | 76 | | 98 | 68.6 |
| Flexural modulus | | | | |
| Dry | | | | |
| Room temp., psi × 10$^{-6}$ | 18.6 | | 19.6 | 17.9 |
| 450° F., psi × 10$^{-6}$ | 18.6 | | 10.3 | 16.7 |
| Wet | | | | |
| 450° F., psi × 10$^{-6}$ | 13.5 | | too poor to measure | 10.6 |

*Intermediate Modulus, IM6
**High Strength, CELION ®

From the foregoing results it is evident that the resin composition according to this invention (Example 1) provides good laminated panels with excellent toughness as represented by impact testing and by resistance to edge delamination, making it substantially superior to the first state-of-the-art system (A), and demonstrating thermal and moisture resistance, as represented by flexural modulus test results, substantially superior to the second state-of-the-art system (B).

The foregoing patents and publications are incorporated herein by reference. Many variations in the present invention will suggest themselves to those skilled in this art in light of the above detailed description. For example, instead of a bis-maleimide derived from maleic acid, one derived from Nadic, citraconic or tetrahydrophthalic acid can be used. Instead of 3,3'-diaminodiphenyl sulfone, 4,4'-di(3,3'-aminophenoxydiphenyl)sulfone can be used. Instead of o,o'-diallyl bisphenol A, 4,4'-hydroxy-3,3'-allyldiphenyl can be used. Instead of 2-ethyl-4-methylimidazole, 2-phenyl imidazole can be used. Instead of fibrous graphite or carbon, glass or quartz reinforcements, ceramic fibers, such as 3M Company's NEXTEL ® fibers, and DuPont Company's KEVLAR ® aramid fibers can be used. All such obvious modifications are within the full intended scope of the appended claims.

I claim:

1. A resin composition comprising:
   (i) 40 to 95 percent by weight of a mixture of unsaturated N,N'-bis-imides of the formula:

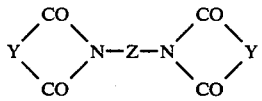

where Y represents a divalent radical of at least 2 carbon atoms and contains a carbon-carbon double bond and in major portion of the mixture, Z is the residue of at least one aromatic diamine and in the minor portion of the mixture Z is the residue of an aliphatic diamine;
   (ii) 5 to 60 percent by weight of a heat-activatible cross-linking agent combination for said bis-imides (i), said combination comprising (1) 1 to 99 parts by weight of an arylene polyamine compound and (2) 99 to 1 parts by weight of an alkenyl phenol or an alkenylphenol ether; and
   (iii) 0 to 5 percent by weight of an imidazole polymerization catalyst.

2. A composition as defined in claim 1 wherein the cross-linking agent comprises 3,3'-diaminophenyl sulfone and o,o'-diallyl bisphenol-A.

3. A composition as defined in claim 1 wherein Y is derived from an acid or anhydride selected from maleic, citraconic, Nadic, tetrahydrophthalic or tetrahydronaphthalic.

4. A composition as defined in claim 3 wherein the bis-imide is a maleimide derived from at least one diamine selected from ethylene diamine, hexamethylene diamine, phenylene diamine, trimethylhexamethylene diamine, methylene dianiline, toluene diamine, 4,4'-diphenylmethane diamine, 4,4'-diphenylether diamine, 4,4'-diphenylsulfone diamine, 4,4'-dicyclohexanemethane diamine, metaxylylene diamine, 4,4'-diphenylcyclohexane diamine, 3,3'-diphenyl sulfone diamine or a mixture of any of the foregoing.

5. A composition as defined in claim 1 wherein 75 to 95 percent by weight of mixture (i) consists of bis-imides derived from aromatic diamines.

6. A composition as defined in claim 5 wherein mixture (i) has a melting point between 70° and 125° C.

7. A composition as defined in claim 1 wherein Y contains from 2 to 6 carbon atoms.

8. A composition as defined in claim 1 wherein the bis-imide is an N,N'-bis-maleimide.

9. A composition as defined in claim 8 wherein said mixture of bis-imides (i) is derived from diamines consisting essentially of 50 to 80 percent of methylene dianiline, 5 to 30 percent of toluene diamine and 5 to 25 percent of trimethyl hexamethylene diamine.

10. A composition as defined in claim 9 wherein said imidazole polymerization catalyst is present in an amount from 0.01 to 1.0 percent by weight.

11. A composition as defined in claim 10 wherein said catalyst is 2-methyl-4-ethylimidazole.

* * * * *